Jan. 22, 1952 G. MAXON, JR 2,583,002
FLAME CUTTING MACHINE
Filed April 28, 1947 6 Sheets-Sheet 1

Jan. 22, 1952 G. MAXON, JR 2,583,002
FLAME CUTTING MACHINE
Filed April 28, 1947 6 Sheets-Sheet 2

Inventor
Glenway Maxon Jr.

Jan. 22, 1952　　　　G. MAXON, JR　　　　2,583,002
FLAME CUTTING MACHINE
Filed April 28, 1947　　　　　　　　　　　　6 Sheets-Sheet 3

Inventor
Glenway Maxon Jr.

Jan. 22, 1952 G. MAXON, JR 2,583,002
FLAME CUTTING MACHINE
Filed April 28, 1947 6 Sheets-Sheet 4
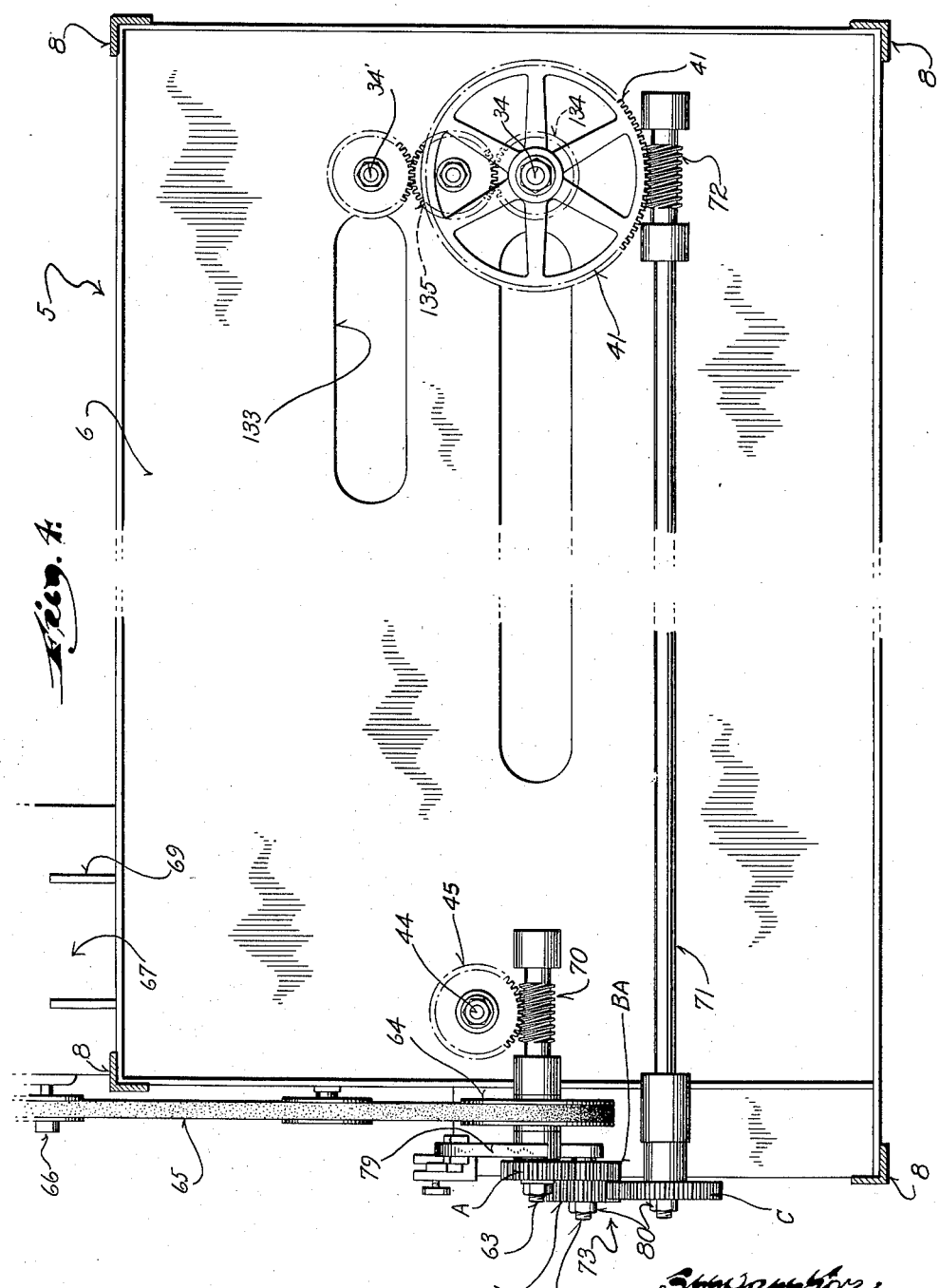

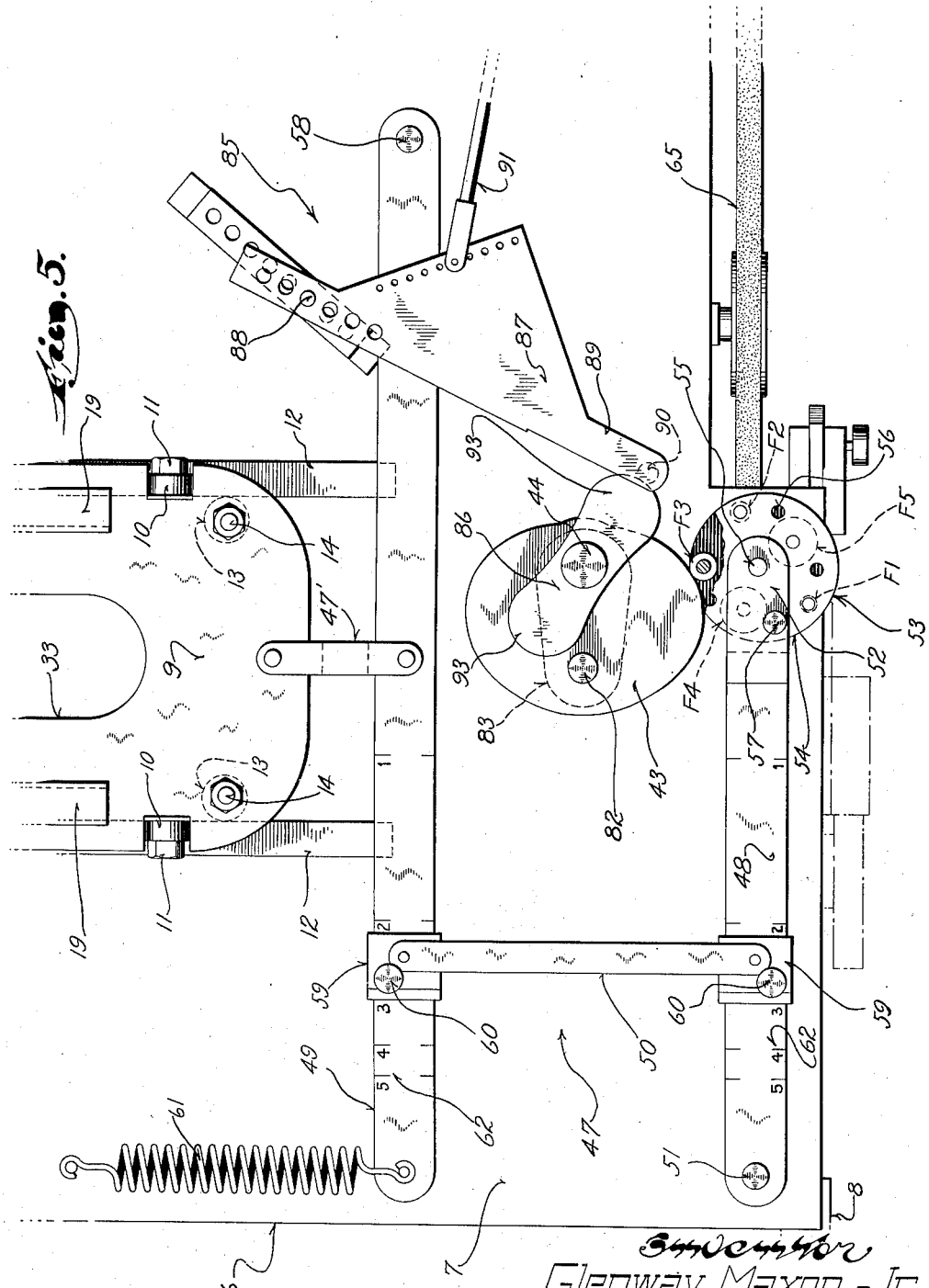

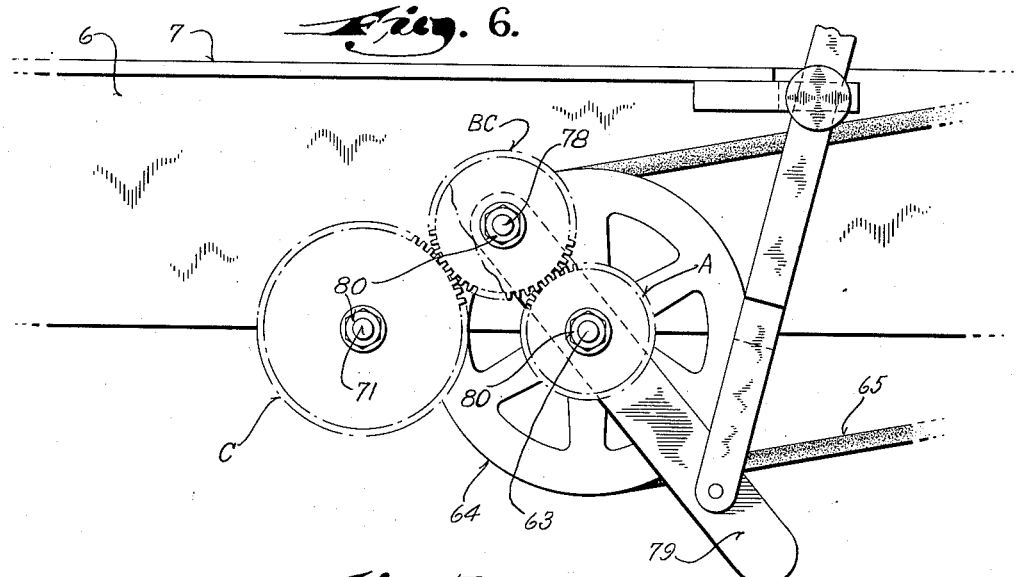
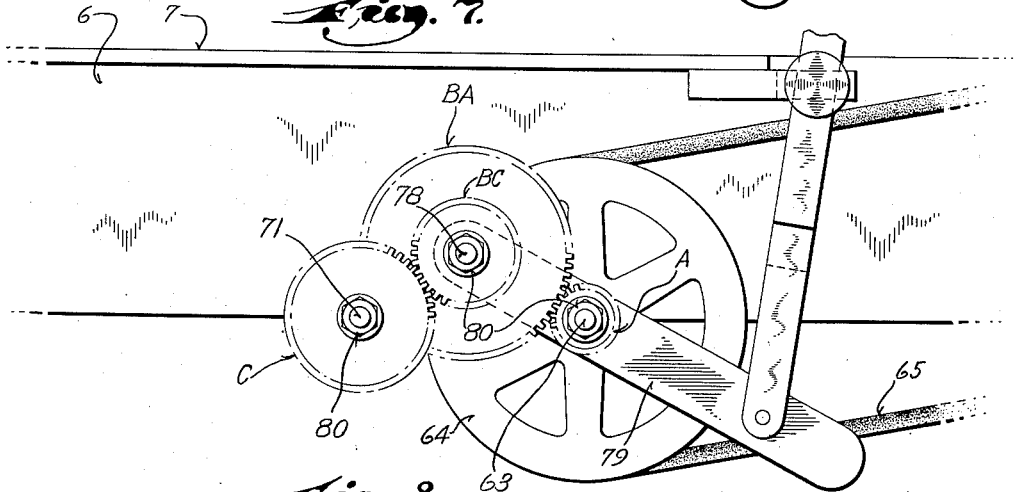
| NO. OF TEETH ON SYNCHRONIZING GEARS | | | | NO. OF TEETH CUT IN BLANK BY COMBINATIONS OF A, BA, BC, C |
|---|---|---|---|---|
| A DRIVE PINION | BA PINION IDLER | BC IDLER IN MESH WITH C | C ON SPINDLE DRIVE SHAFT | |
| 20 | 64 | 32 | FROM 30 TO 100 | SAME NO. AS IN C |
| 40 | 44 | 44 | 24 TO 100 BY FOURS | C÷4 (6 TO 25) |
| 40 | 44 | 22 | 30 TO 100 BY TWOS | C÷2 (15 TO 50) |

Patented Jan. 22, 1952

2,583,002

UNITED STATES PATENT OFFICE 2,583,002

FLAME CUTTING MACHINE

Glenway Maxon, Jr., Milwaukee, Wis.

Application April 28, 1947, Serial No. 744,383

8 Claims. (Cl. 266—23)

This invention relates to the cutting of toothed wheels such as gears and sprockets, and has as one of its objects the provision of an automatically operable machine by which teeth may be flame cut on gear and sprocket blanks by means of a cutting torch.

Another object of this invention resides in the provision of a flame gear cutting machine which is readily adjustable to enable teeth of various shapes and types to be accurately cut on suitable gear blanks.

Inasmuch as the face flanks of the teeth on any gear or sprocket must be smooth and held to relatively close tolerances, it is another object of this invention to provide a flame cutting machine for cutting teeth on suitable wheel blanks which incorporates means for assuring substantially uniform lineal speed of the torch with relation to the wheel blank for the production of teeth on the blank having relatively smooth profiles requiring little or no further treatment such as grinding and/or polishing.

Still another object of this invention resides in the provision of a flame cutting machine for accurately cutting teeth on suitable wheel blanks, wherein the cutting torch and the blank acted upon by the torch are mounted for back and forth motion relative to one another and wherein the blank is caused to be rotated in synchronization with back and forth motion of the torch and blank relative to one another so as to produce equispaced identically shaped teeth on the blank.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 4 is a bottom view showing the under side of the machine;

Figure 5 is a plan view of the pantograph mechanism and the drive and speed control cams by which motion of the torch and rotation of the spindle is controlled;

Figure 6 is a diagrammatic view of the change gears;

Figure 7 is also a diagrammatic view similar to Figure 6 but showing a different combination of gears; and Figure 8 illustrates a chart provided to facilitate selection of gear changes.

Figure 1:
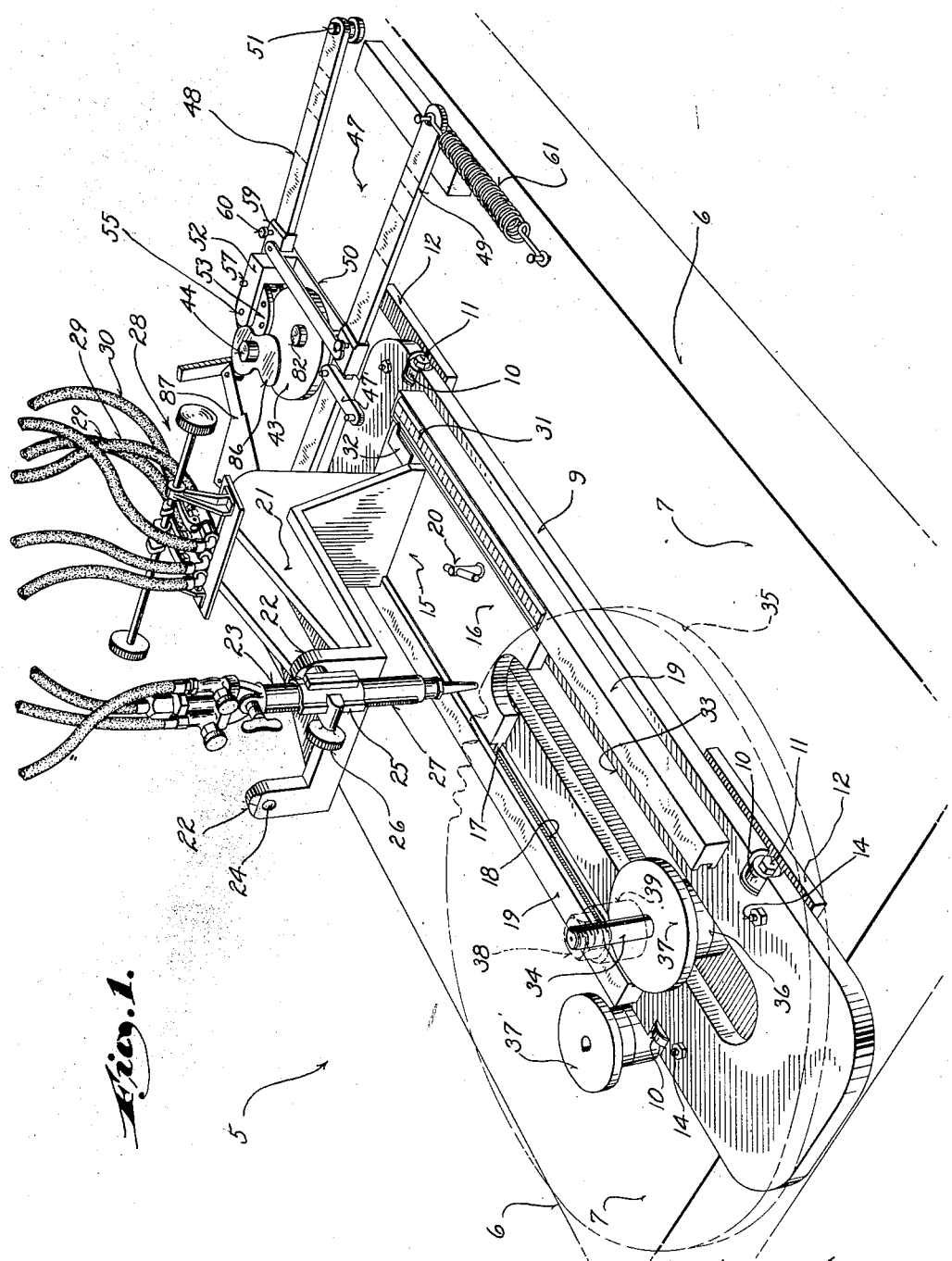
Figure 1 is a perspective view of the entire machine looking down on top of it from one front corner.

Referring now more particularly to the accompanying drawings, the flame cutting machine generally designated 5 comprises a base or table 6 having a relatively flat top 7 supported at a convenient height above the floor by legs 8 at the four corners thereof.

This machine includes a carriage 9 formed from an elongated relatively flat plate. Rollers 10 journalled on studs 11 at the opposite sides of the carriage near the four corners of the plate rest on tracks 12 on the table top to mount the carriage for back and forth motion along the length of the table and in a direction lengthwise of the carriage. It will be noted that the studs 11 enter the side edges of the carriage plate to mount the rollers 10 on horizontal axes, all of which lie in the same plane substantially parallel to the table top.

Other rollers 13 are carried by the carriage near the four corners thereof at the underside of the carriage plate 9 for rotation on vertical axes and these latter rollers engage the inner sides of the rails 12 to constrain the carriage to straight line reciprocatory motion. The rollers 13 are mounted on bolts 14 and it will be understood that the shank portions of the bolts which journal the rollers may be eccentric so that rotation of the bolts in the threaded holes provided for the same in the carriage plate permits the rollers 13 to be adjusted and brought into intimate contact with the inner sides of the rails 12 to assure the desired straight line reciprocation of the carriage.

The carriage 9 has a bracket 15 mounted on its top side near the rear of the carriage. The bracket 15 includes a relatively flat base 16 having tongues 17 along the opposite side edges thereof freely slidably engaged in grooves 18 formed on the inner faces of a pair of opposite longitudinal rails or channels 19 fixed on the top side of the carriage plate 9.

Engagement of the tongues 17 in the grooves 18 of the carriage channels provides for longitudinal adjustment of the bracket, that is, lengthwise of the carriage, and the bracket is readily locked in place at any desired position of adjustment by means of a set screw threaded into the base 16 of the bracket to have its end press against the top of the carriage plate 9, and adapted to be tightened and loosened by a readily removable wrench or handle 20.

Projecting upwardly and forwardly from the base 16 of the bracket is a bridge member 21. The forward end of the bridge member overlies the carriage in spaced relation thereto and has a pair of laterally spaced lugs 22 thereon providing for mounting a torch 23 on the bracket. For this purpose each of the lugs is provided with a hole 24 for readily detachably connecting a torch clamp 25 to one of the lugs. The torch clamp when secured in place upon one of the lugs as shown in Figure 1 receives the tubular body of the torch and holds the same in any desired position of vertical adjustment with the nozzle of the torch pointing downwardly.

An adjusting screw 26 on the torch clamp has a pinion (not shown) connected thereto so that turning of the screw in one direction or the other adjusts the torch up or down, it being understood that the pinion meshes with the rack 27 on the side of the torch body to effect the desired vertical adjustment of the torch.

The bracket 15 also mounts manually operable valve mechanism 28 for controlling the supply of high and low pressure oxygen as well as acetylene to the torch through the oxygen supply lines 29 and an acetylene line 30.

One of the rails or channels 19 on the carriage 9 is provided with a pitch diameter scale 31, and a pointer 32 on the bracket cooperates with the scale to enable the bracket to be adjusted longitudinally of the table and relative to the carriage for the cutting of toothed wheels of different pitch diameters, as will appear more fully hereinafter.

The carriage 9 has a longitudinal slot 33 therein, and a rotatable arbor or work spindle 34 projects vertically up from the table through the slot 33 to receive a gear or sprocket blank 35 on its upper extremity. A suitable bearing structure 36 on the table journals the arbor or spindle for rotation on a fixed vertical axis near the forward end of the table, and an arbor flange 37 fixed to the spindle above the carriage provides a horizontal supporting surface upon which the blank to be cut may rest.

The blank on which gear or sprocket teeth are to be cut is readily secured to the spindle for rotation therewith by means of a nut 38 threaded on the upper extremity of the spindle and arranged to exert pressure upon the top face of the blank to clamp the same down onto the arbor plate 37 either directly or through the medium of one or more spacers such as indicated by the numeral 39 encircling the spindle and interposed between the nut 38 and the upper face of the blank.

The spindle extends a distance beneath the table top and the lower extremity thereof projects from the bearing structure to have a worm wheel 41 fixed thereto.

With a suitable blank in position upon the spindle the bracket 15 carrying the torch 23 is readily adjustable relative to the carriage 9 to bring the nozzle of the torch over the blank at a distance from the spindle axis corresponding to either the root or outside diameter of the teeth to be cut by the machine. The set screw handle 20 is then turned to anchor the bracket and consequently the torch to the carriage.

Teeth are adapted to be cut on a blank 35 in position on the spindle by reciprocation of the carriage and consequently the torch thereon toward and from the spindle axis while the spindle is rotated slowly and in timed relationship to reciprocation of the carriage.

Reciprocatory motion is imparted to the carriage by means of a driving cam 43 located above the table top behind the carriage. The cam is readily detachably fixed on a vertical cam shaft 44 journaled in a suitable bearing structure (not shown) beneath the table top for rotation on a fixed vertical axis. A worm wheel 45 fixed on the lower extremity of the cam shaft projecting from the bearing structure provides for imparting rotation to the cam shaft.

Rotation of the drive cam 43 is translated into reciprocatory motion of the carriage 9 through a set of pantograph levers 47 and a link 47' connecting the pantograph levers with the rear of the carriage. The pantograph leverage includes a laterally extending lever 48 at the rear side of the drive cam, a cooperating lever 49 at the front side of the cam between it and the rear of the carriage, and a cross link 50 connecting the two levers. The rearmost lever 48 has one end disposed alongside the cam 43 and its other end pivotally supported from the table as at 51 near one side thereof and remote from the driving cam. The free end of the lever 48 which is disposed alongside but rearwardly of the driving cam 43 is provided with jaws 52 spaced apart vertically to receive a follower selecting wheel 53 therebetween.

The follower wheel comprises a pair of spaced apart discs 54 having a series of cam followers F1, F2, F3, F4, and F5 of different diameters confined therebetween for rotation on vertical axes normal to the discs.

The follower wheel is journaled on a pin 55 carried by the jaws 52 and has a series of holes 56 in the topmost disc thereof, any one of which is adapted to receive a locater pin 57 passing through the uppermost one of the jaws 52 to hold the proper follower engaged with the periphery of the drive cam 43.

The forward one of the pantograph levers has one end thereof pivotally supported from the table as at 58 near the side of the table opposite the pivot 51 for the lever 48, and has its free end extending laterally across the table in front of the drive cam.

The cross link 50 connects the two pantograph levers in substantially parallel relationship and has clamps 59 at its opposite ends by which the cross link may be secured in any desired position of adjustment along the length of the levers to provide for adjustment of the extent of reciprocatory motion imparted to the carriage by the drive cam in an obvious manner. Thumb-screws 60 passing through the clamps and engaging the levers provide for locking the cross link onto the levers in the desired position between the ends of the levers.

A tension spring 61 connecting with the free end of the forward lever 49 exerts a forward pull on the rearmost pantograph lever through the cross link 50 and maintains the selected cam follower firmly engaged with the periphery of the drive cam 43 so that rotation of the drive cam produces oscillatory motion of the forward pantograph lever 49 through an arc the magnitude of which depends jointly upon the throw of the driving cam and upon the adjustment of the cross link 50 longitudinally of the pantograph levers.

Figure 2:
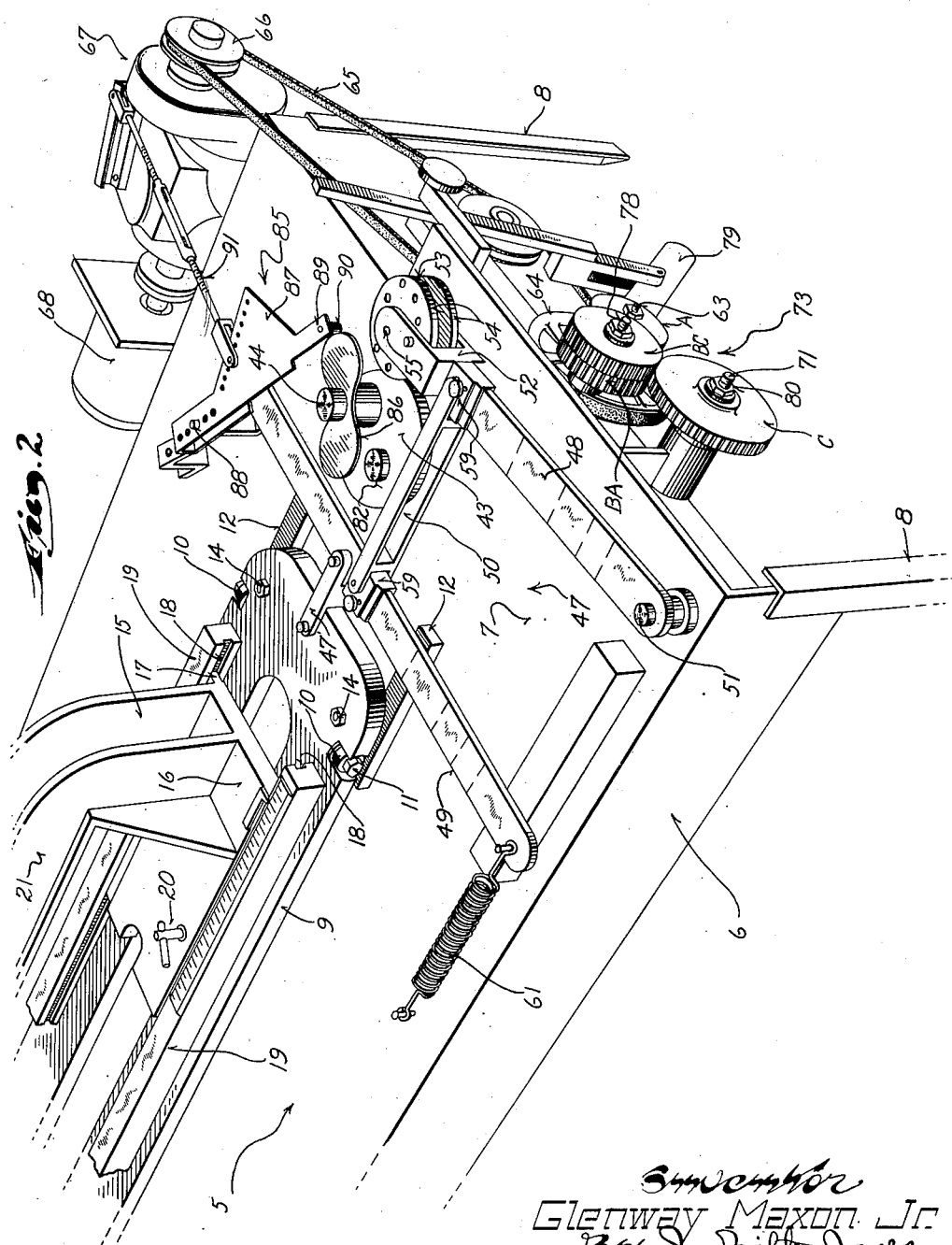
Figure 2 is a perspective view looking down at the rear portion of the machine.
Figure 3:
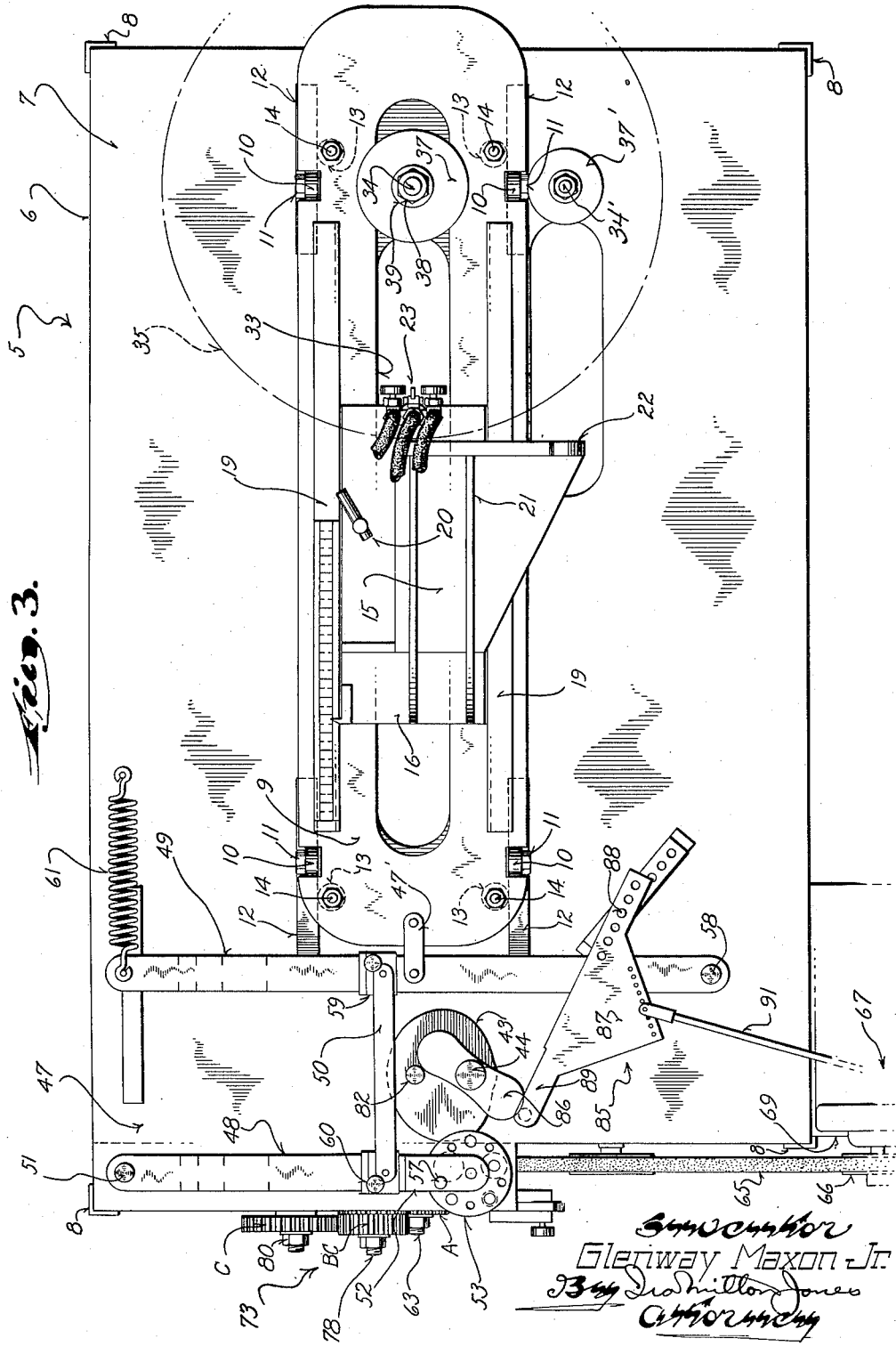
Figure 3 is a plan view of the entire machine.

Assuming for instance that the cross link 50 is adjusted so as to be positioned relatively close to the driving cam as shown in Figure 2, it will be apparent that the forward lever 49 will oscillate through an arc of maximum magnitude in consequence to rotation of the drive cam. Conversely if the cross link 50 is adjusted so as to dispose the same a maximum distance from the drive cam 43, it will be apparent that rotation of the drive cam produces oscillation of the foremost lever 49 through an arc of minimum magnitude.

Hence, it will be seen that the adjustment of the cross link 50 determines the extent or limits of carriage reciprocation, and accordingly determines the depth of the tooth to be cut in the blank. From this it follows that the diametral pitch of the teeth cut on the blank is determined jointly by the speed of rotation of the spindle for the blank and the setting of the cross link 50 on the pantograph levers.

In order to facilitate adjustment of the pantograph leverage by means of the cross link for the cutting of different diametral pitch teeth, both levers 48 and 49 bear identical scales 62 thereon, and the side edges of the clamps 59 facing away from the driving cam 43 are adapted to be set on lines of the scales which correspond to one another during bodily adjustment of the cross link.

The camshaft 44 is driven from a power shaft 63 journalled in suitable bearings beneath the table top for rotation on a substantially horizontal axis extending in the direction of carriage reciprocation, and the power shaft extends to the rear end of the machine to mount a pulley 64 thereon. A belt 65 connects the pulley 64 with a drive pulley 66 on the output shaft of a transmission mechanism 67 of the Graham type.

The input shaft of the transmission mechanism is drivingly connected with a high speed, low horsepower electric motor 68, and both the motor and the transmission mechanism are mounted on a suitable bracket 69 fixed to the side of the table at the rear portion thereof.

Rotation of the motor imparts low speed rotation to the power shaft 63 through the medium of the transmission mechanism 67 and the belt 65, and a worm 70 on the power shaft meshing with the worm wheel 45 on the camshaft transmits driving torque to the camshaft to rotate the same during operation of the motor 68.

Rotation is imparted to the spindle 34 through a spindle drive shaft 71 journalled in suitable bearings on the table beneath the top thereof. The shaft 71 is alongside and parallel to the power shaft 63, and its forward end which is disposed adjacent to the spindle carries a worm 72 meshing with the spindle worm wheel 41 so that rotation of the spindle drive shaft produces slow rotation of the spindle and the gear or sprocket blank thereon.

In order to enable the cutting of uniformly spaced teeth of any one of a number of different diametral pitches, or more generally sizes, it is essential that the speed at which the spindle drive shaft 71 is driven be readily changeable with relation to the speed of rotation of the power shaft 63 from which the cam 43 is driven. In other words, it is a prerequisite to the accurate cutting of a tooth of a certain diametral pitch or size on the blank that the speed of rotation of the blank be coordinated with the extent of torch reciprocation as determined by the setting of the cross link 50 on the pantograph levers.

Readily changeable gears generally designated 74 are provided for this purpose. These gears drivingly connect the spindle drive shaft 71 for rotation with the power shaft 63 with a speed ratio between the two shafts depending upon the sizes of the gears employed.

The change gears 73 include a drive pinion A on the power shaft 63 outwardly of the pulley 64, a driven gear C on the spindle drive shaft, and a pair of idler gears BA and BC meshing with the pinion A and driven gear C respectively. The idler gears BA and BC are attached to one another in any suitable manner to rotate as a unit and are rotatably journalled on a stud 78 fixed on one end of a lever 79 medially pivotally supported on the rear portion of the power shaft between the drive pinion A and the pulley 64.

The stud 78 projects rearwardly from the lever to mount the idler gears BA and BC for rotation on an axis parallel to and slightly above the power and spindle drive shafts and since the idler gears are constrained to rotate in unison, it follows that the driven gear C by its meshing engagement with the idler gear BC will drive the spindle shaft 71 at a speed determined by the numbers of teeth on the pinion, the idler gears and the driven gear C.

Attention is directed to the chart shown in Figure 8 for a better understanding of the relationship between the speeds of the power shaft and the spindle drive shaft for any one setting of the cross link 50 on the pantograph levers to cut a predetermined number of teeth on a blank on the spindle. This chart gives the numbers of teeth on three different sets of change gears to enable the cutting of from 15 to 100 teeth on the blank.

According to the chart, if the drive pinion A has 20 teeth, the pinion idler BA 64 teeth, the driver BC rotating with the pinion idler 32 teeth, and the gear C on the spindle drive shaft anywhere from 30 to 100 teeth, the number of teeth cut in the blank will be a number corresponding to the number of teeth on the gear C on the spindle drive shaft.

From this it follows that with the first set of gears specified in the chart, the torch will cut from 30 to 100 teeth depending upon the pitch diameter setting of the torch bracket on the carriage, all of a given desired diametral pitch, and without any necessity for altering the position of the cross link 50 on the pantograph levers.

The change gears shown in Figures 2 and 6 are those listed second in the chart; the drive pinion A having 40 teeth, its companion gear BA having 44 teeth, the idler gear BC rotating in unison with the gear BA likewise having 44 teeth, and the gear C on the spindle drive shaft having 64 teeth. According to the chart, the gear C may be one having teeth ranging in number from 24 to 100 by fours. In other words with gears A, BA, and BC having the number of teeth designated, the smallest gear C to be used on the spindle drive shaft is one with 24 teeth, and this gear is readily interchangeable with other gears whose teeth increase in number by fours, such as 28, 32, 36, 40, etc. tooth gears.

The number of teeth which will be cut in the blank with the combination of gears listed second in the chart thus corresponds to the number of teeth on the gear C divided by four, so that anywhere from 6 to 25 teeth may be cut on the blank by the torch with proper adjustment of the torch bracket on the carriage to produce the required pitch diameter of the gear, and with a single setting of the cross link 50 on the pantograph levers.

With the 64 tooth gear C shown in the drawings therefore, and the cross link 50 adjusted for maximum throw as shown, which may be assumed to be the position of the cross link for the cutting of a 1 DP tooth on the blank, the torch bracket must be adjusted for a 16" DP gear so that the torch will cut exactly 16 equispaced teeth of 1 DP on the blank.

The third set of change gears listed in the chart show the numbers of teeth for the gears A, BA and BC which may be used with a gear C on the spindle drive shaft having teeth numbering from 30 to 100 and increasing by two's for the cutting of from 15 to 50 teeth on the blank. The number of teeth cut in the blank by this combination of change gears will be equal to the number of teeth on the gear C divided by two, with a single setting of the cross link 50, but with the proper adjustment of the torch bracket.

In order that the gears A, BA, BC, and C be readily detachable to enable the same to be changed in favor of different sets of gears, the rear extremities of the power shaft and the drive shaft as well as the outer extremitiy of the stud are threaded to receive retaining nuts 80, and it is merely necessary to back these nuts off the threaded extremities of the shafts and the stud for removal of the gears.

By way of illustration, it may be assumed that the machine here shown is operable to cut teeth on gear or sprocket blanks ranging in number from 6 to 100 and of a diametral pitch of any value from 1 DP to 5 DP. The number of large sized teeth to be cut in a gear or sprocket blank, is, of course, limited to correspond to a gear having a pitch radius substantially equal to the distance of the torch from the spindle 34 when the torch bracket has been adjusted to its rearmost position on the carriage.

In this respect it is to be noted that the forward arm of the bridge 21 in effect defines a throat between the torch and the upstanding portion of the bracket 15 which allows clearance for the corners of rectangular or square plates or the like which may be used as gear or sprocket blanks.

Referring again to the drive cam 43, it should be noted that the profile of the teeth cut on the gear or sprocket blank, and particularly the pressure angle of the face flanks of these teeth, is determined jointly by the shape of the cam and the setting of the cross link 50 on the pantagraph levers. For this reason the drive cam 43 is made readily detachable from the cam shaft 44, the cam being apertured eccentrically to receive the cam shaft and having a suitable hole to receive a lock pin 82 which passes therethrough and is received in a corresponding aperture (not shown) in a lever-like arm 83 fixed on the cam shaft and supporting the drive cam at the proper elevation or axial position on the cam shaft.

It will, therefore, be apparent that the drive cam 43 is readily interchangeable with other cams similar thereto but designed to effect the cutting of teeth having different profiles.

From Figure 5 it will be seen that the five cam followers F1, F2, F3, F4, and F5 progressively increase in diameter, the follower F1 being smallest and the follower F5 having the largest diameter. The selector wheel upon which the followers are mounted is adapted to be set by means of the pin 57 to bring the follower F1 into cooperating relationship with the periphery of the drive cam 43 when the cross link 50 on the pantagraph levers is set to produce the largest size tooth of which the machine is capable of cutting. As stated previously, this setting may be assumed to make possible the cutting of a 1 DP tooth on the gear blank, and as seen in Figure 2 the cross link 50 is adjusted to a position on the scale of the pantagraph leverage close to the drive cam to produce maximum throw of the levers.

Adjustment of the cross link 50, for instance to a setting on the levers to produce a smaller tooth such as 2 DP tooth, likewise requires adjustment of the followers selector wheel to bring the next larger diameter cam follower F-2 in to cooperative relationship with the periphery of the drive cam. In like manner a cam follower F3 is brought to bear against the periphery of the drive cam by adjustment of the follower selector wheel, when the pantagraph cross link 50 is set to produce a 3 DP tooth on the gear blank, and so on.

The purpose of increasing the diameter of the cam followers in accordance with decrease in the size of the tooth to be cut on the gear blank, is to compensate for the diameter of the flame which produces the cut forming the teeth in blanks having the same thickness and which are cut with a flame of a single diameter. In other words, if the flame produces the proper profile on a 1 DP tooth in the setting of the cross link shown in Figure 2, error would result in the cutting of teeth upon adjustment of the cross link 50 to cut a 5 DP tooth, for instance, without also compensating for the diameter of the flame.

The different diameter rollers which may be brought to bear against the periphery of the drive cam thus enable the distance from the center of the flame to the desired profile of the tooth to be cut, to be maintained constant when the proper roller is employed in the different settings of the cross link 50.

Also, whenever it is necessary to increase the size of flame to cut metal of greater than a predetermined thickness, a larger cam follower may be used as a compensating means.

If the torch carriage is reciprocated back and forth at a constant rate of speed and the spindle upon which the blank is mounted likewise rotated at a constant rate of speed, it will be apparent that the lineal speed of the torch with respect to the blank will be less at the roots and outer extremities of the teeth being cut than at the face flanks of the teeth. This results from the fact that the face flanks of the teeth are cut during the intervals of most rapid speed of the torch relative to the blank, between the limits of reciprocatory motion of the carriage.

Stated in another manner, it will be seen that a drive cam 43 having a suitable shape for the cutting of the desired tooth profile on the blank will drive the torch between predetermined limits of back and forth motion and will momentarily hold the torch nearly stationary relative to the blank being cut, at the tooth extremities and at the roots of the teeth, while more or less rapidly moving the torch relatively to the blank during the cutting of the face flanks of the teeth.

From this it follows that lineal speed of the torch flame relative to the blank is relatively slow at the tooth extremities and at the roots of the teeth but is relatively fast when cutting the face flanks of the teeth.

In order to produce teeth with smooth and accurate profiles, therefore, it is necessary to assure substantially uniform lineal speed of the torch relative to the surface of the gear or other blank on the spindle.

For this purpose the machine is provided with speed controlling mechanism 85 to control reciprocatory motion of the torch carriage and rotation of the spindle for the blank to be cut. This mechanism comprises a cam 86 detachably secured to the cam shaft 44 and disposed above the drive cam 43. A lever 87 pivotally mounted on the table top as at 88 has its free end 89 disposed alongside the periphery of the cam 86 to have a cam follower 90 on the lever bear against the cam. The lever 87 is connected by means of a link 91 with the speed change friction ring (not shown) of the transmission 67 so as to regulate the speed of the transmission in accordance with rotation of the cam 86. For a more complete disclosure of the transmission 67 and the manner of varying its speed, reference may be had to Patent No. 2,196,292 issued to Charles L. Coughlin April 9, 1940.

For the cutting of more or less standard gear or sprocket teeth on the blank the cam 86 is provided with two opposite lobes 93 which act through the lever 87 and link 91 in such a manner on the speed change mechanism of the transmission 67 as to alternately accelerate and decelerate the speed of the output shaft of the transmission mechanism twice for each tooth cut on the blank. This means that the cam 86 is so positioned angularly on the cam shaft 44 with respect to the drive cam 43 that it will accelerate the speed of the spindle and the cam shaft 44 near the extremities of reciprocatory motion of the torch carriage at which times the flame of the torch will be cutting the roots and the outer extremities of the teeth on the blank, while decelerating the speed of rotation of the spindle and the cam shaft 44 between the limits of torch motion so as to slow down the cutting operation at the face flanks of the teeth on the blank.

Although the cam 86 effects alternate speeding up and slowing down of the cam shaft 44, it should be borne in mind that the speed of travel of the torch is largely determined by the shape of the drive cam 43; and that the two cams 43 and 86 are so related as to cooperate with one another in controlling the relative speeds of the torch and blank.

As was pointed out previously, if there were no control over the speed of motion of the spindle and the speed of reciprocatory motion of the torch carriage the effect produced is one where the torch travels too slowly at the roots and outer extremities of the teeth and too fast along the face flanks of the teeth. However, the present control mechanism, in providing synchronized accelerations and decelerations in spindle and torch motions, assure substantially uniform speed of the cutting torch relative to the blank on the spindle and the production of a perfectly smooth kerf on the blank defining accurate teeth thereon.

Due to the close relationship between the shape of the drive cam 43 and that of the speed controlling cam 86, it will be apparent that the substitution of different drive cams 43 designed to produce teeth of different shapes on the blank may likewise require the substitution of a suitably designed speed controlling cam 86 for that shown in order to produce the desired uniform lineal cutting speed of the torch.

Also, by alternately accelerating and decelerating the speed of rotation of both the spindle and the cam shaft, it will be seen that teeth of different sizes but similar shapes may be cut using the same drive cam 43, whereas this advantage is lost if the speed of only one of these elements is changed.

*Operation*

Assuming that it is desired to cut a 16" pitch diameter gear of 1 DP by means of the flame cutting machine of this invention, a suitable blank is first selected and secured upon the spindle 34 to rotate therewith. The blank may be a plate square or rectangular in shape and of the desired thickness or it may be a circular blank of a diameter slightly greater than the outside diameter of the 16" pitch diameter gear to be cut therefrom.

The torch bracket 15 is then set to have its pointer 32 aligned with the 16" mark on the scale 31 of the carriage, and the cross link 50 of the pantograph leverage adjusted to the 1" DP marks on the scales on the two levers. Inasmuch as this setting of the cross-link is for the maximum size tooth, the smallest cam follower F1 is brought to bear against the periphery of the drive cam 43 by proper adjustment of the follower selector wheel on the lever 48.

A suitable set of change gears must now be employed, and assuming that the second set of gears A, BA, and BC illustrated in the chart, Figure 8, are in position on the power shaft 63 and the idler stud 78, it will be necessary that a 64 tooth gear C be secured on the spindle drive shaft 71 in order that 16 1 DP teeth may be cut on a gear having a 16" pitch diameter.

If desired, the torch may be lighted upon suitable manipulation of the valve mechanism 28 controlling the supply of high and low pressure oxygen and acetylene to the nozzle thereof while the carriage is normally held retracted from the blank. With the torch lighted and the flame adjusted and accurately positioned by the adjusting screw 26 controlling the vertical position of the torch, the entire carriage may be fed toward the blank on the spindle in which direction it is urged by the spring 61, and assuming that the drive cam 43 has been previously set to correspond to the outside diameter of the teeth to be cut, the motor is started to place the machine in operation as soon as the cam follower strikes the periphery of the cam 43.

The controlled reciprocation of the torch carriage along with rotation of the blank on the spindle, therefore, will result in the automatic and accurate cutting of 16 1 DP gear teeth on the blank, and upon completion of the cutting operation the machine is stopped and the finished gear may be removed from the spindle.

Inasmuch as the components of torch and gear blank motions are radial (that of the torch carriage in relation to the table) and tangential (that of a point on the blank in reference to the table), the combined motions trace a curve in polar co-ordinates. Therefore, the necessary cam contour for the cutting of involute, cycloidal, or any curve which can be plotted in polar co-ordinates, can be computed and constructed for any set of desired tooth characteristics wherein the tangential component of motion from the cam so constructed does not equal zero.

Likewise, wherever the speed characteristics of the variable speed transmission mechanism are known, a speed cam can be constructed which so controls the transmission mechanism that the vector sum of the radial and tangential velocities referred to above may be kept substantially constant.

When homologous gears are cut using the same cam and change gears, the rate change of radial and tangential velocities will be the same, and the teeth cut will be similar. The number of teeth cut in a given time, however, must vary in inverse proportion to the size of the teeth. The cutting of an increased number of teeth per unit of time is readily enabled by adjustment of the length of the link 91 connecting the speed control lever 87 with the transmission mechanism.

Should a variation result in the speed of the torch in reference to the surface of the blank in consequence to the "speeding up" of the cutting operation as described, the speed of the torch at the ends and the roots of the teeth may be altered in relation to the speed of the torch at the face flanks of the teeth by means of adjustment of the connection between the speed control lever and the link 91; and for this purpose the lever 87 has a number of holes along its side edge providing a wide choice of different connections between the link 91 and the lever.

It is now apparent to one skilled in the art that many mathematical tooth contours can be cut. Involute or cycloidal tooth flanks for gears, circular, elliptical, or flat roots and points, and all types of sprocket and ratchet teeth can be generated by the combined motions described.

In making gears it is frequently found advisable to modify the form of the teeth. Between gears of few teeth meshing with gears of many teeth, interference may occur. In conventional design a number of expedients are now resorted to for eliminating such interference and to improve strength or action, or both, between such gears. These expedients include increasing the apparent pitch diameter of the pinion and decreasing that of the gear meshing therewith; shortening teeth; and changing the contour of the contacting surfaces of the teeth near their points.

All of these expedients for improving tooth action are readily available to the operator of the machine of this invention. Gears of small numbers of teeth for driving gears having comparatively many teeth, which have specially designed teeth to operate with unusual satisfaction, are called conjugate gears; and such gears with modified diameters and tooth contours may be made at will on the machine of this invention by proper positioning of the cross link 50 on the pantograph levers without changing the diameter of the gear being cut. Altering the gear diameters, however, without altering the position of the pantograph cross link 50, will also effect change in the tooth contour, making the teeth thinner or thicker in direct proportion to the change in diameter, and the tooth curves more or less nearly radial.

From this it will be seen that the flame gear cutting machine of this invention has an unusual degree of versatility, and in this respect it should also be noted that for the cutting of small sized gears and sprockets, the blanks therefor are adapted to be secured to an alternate arbor flange 37' alongside the main spindle 34 and longitudinally in line with the alternate lug 24 on the bridge member which is provided to mount the torch in a position laterally adjacent to the torch carriage. The arbor flange 37' is fixed on an alternate spindle 34' to rotate therewith, and this spindle has a small spur gear on its extremity beneath the table top drivingly connected with a similar gear 134 on the main spindle 34 through an intermediate or idler gear 135, as seen in Figure 4. The table top is also provided with a longitudinal slot 133 in line with the alternate spindle 34' and beneath the torch when the same is operating on a small gear or sprocket blank on the alternate spindle.

It is also important to note that gears having teeth either on their inner or outer peripheries may be readily cut automatically by the machine of this invention.

From the foregoing description taken in connection with the accompanying drawings, it will be readily apparent to those skilled in the art that this invention provides a highly versatile apparatus which may be used to automatically cut teeth in suitable blanks with a high degree of accuracy and of a variety of shapes and sizes, and that the cutting operation is performed in a minimum amount of time.

I claim:

1. In a flame cutting machine for cutting toothed objects: a spindle rotatable on a fixed axis and adapted to have a blank secured thereto normal to the spindle axis for rotation with the spindle; a carriage reciprocable toward and from the spindle; a torch mounted on the carriage to have its flame in cutting relationship with a blank on the spindle, said torch being reciprocable with the carriage; spindle drive means for rotating the spindle in one direction; carriage drive means for reciprocating the carriage and the torch thereon between defined limits corresponding to the depth of the teeth to be cut on the blank, said carriage drive means including a rotatable cam, and pantograph leverage connected between said cam and the carriage for translating rotation of the cam into reciprocatory motion of the carriage and the torch thereon; and means for synchronizing said drive means for the spindle and carriage so that the cam completes a number of revolutions corresponding to the number of teeth desired to be cut in the blank during one complete revolution of the spindle.

2. The flame cutting machine set forth in claim 1 wherein said pantograph leverage connected between the cam and the carriage is adjustable so as to enable reciprocation of the carriage by said cam between different predetermined limits corresponding to the depth of the desired teeth to be cut in the blank, and further characterized by the provision of readily interchangeable synchronizing means for said spindle and carriage drive means for enabling the speed of spindle rotation to be coordinated with the carriage reciprocation between different selected limits for the flame cutting of a variety of different teeth on the blank.

3. In a flame cutting device for cutting toothed objects: a rotatable support adapted to have a blank fixed thereto for rotation therewith; a cutting torch for cutting teeth in a blank on the support; means mounting the support and the torch for relative motion along a defined path toward and from one another; drive means including a rotatable element, and motion transmitting means operated by rotation of said rotatable element for effecting relative motion of the torch and support toward and from one another between defined limits corresponding to the depth of the tooth forming cuts to be made in the blank; drive means for rotating the support in one direction; means for synchronizing said two drive means to produce rotation of the support at a speed so related to the rate and extent of relative motion of the torch and support toward and from one another as to produce gear teeth on the blank by the torch; and an adjustable pantograph mechanism forming part of said motion transmitting means for adjusting the extent of relative motion of the torch and support toward and from one another in consequence to rotation of said rotatable element to thereby enable the cutting of different sizes of teeth by the machine.

4. A machine for flame cutting gears comprising: a spindle rotatable on a fixed axis and adapted to have the blank from which the gear is to be cut secured thereto for rotation with the spindle; a cutting torch; means mounting the torch for reciprocation toward and from the spindle and in position to cut through a blank on the spindle; a carriage mounted for reciprocation toward and from the spindle; drive means for effecting reciprocation of the carriage between defined limits including a power driven cam and an adjustable proportioning mechanism connected between the carriage and the cam for translating rotation of the cam into reciprocation of the carriage and enabling adjustment of the effect of the cam upon the carriage so that with the same cam, teeth of different sizes but having the same proportions may be cut; drive means for rotating the spindle; and synchronizing means operatively connecting said two drive means to so relate the speeds of rotation of the spindle and said cam that for each cycle of carriage reciprocation the blank is rotated an arcuate distance equal to the circular pitch of the gear to be cut.

5. In a machine for flame cutting gears, the combination of: a cutting torch constrained to back and forth motion along a predetermined path; means for advancing a blank in which the gear teeth are to be cut along a predetermined path which traverses the path of travel of the torch; variable speed motion transmitting means; a rotatable cam drivingly connected with the variable speed motion transmitting means to be driven thereby; an adjustable proportioning and motion transmitting mechanism connecting the cam with the cutting torch and through which cyclic back and forth motion is imparted to the torch between limits determined by the throw of the cam and the setting of the adjustable proportioning mechanism; drive mechanism connecting the variable speed motion transmitting means with the blank advancing means for advancing the blank along its path a distance equal to the pitch of the teeth to be cut during each cycle of the cutting torch; and speed control mechanism governing said variable speed motion transmitting means and operated in timed relation with the cyclic back and forth motion of the torch for alternately accelerating and decelerating the speed of said variable motion transmitting means and so correlating blank speed with torch speed as to vectorially combine said speeds to produce a resultant speed which is substantially constant.

6. In a machine for flame cutting equi-spaced teeth in a blank, the combination of: a cutting torch constrained to back and forth motion along a predetermined path; drive means for imparting cyclic back and forth motion to the torch between defined limits including a rotatable cam and an adjustable proportioning and motion transmitting mechanism connected between the cam and the torch; means for advancing a blank in which the teeth are to be cut along a predetermined path which traverses the path of travel of the torch; variable speed motion transmitting means; driving mechanism connecting the variable speed motion transmitting means with the blank advancing means for advancing the blank along its path a distance equal to the pitch of the teeth to be cut during each cycle of the cutting torch; and speed control mechanism governing said variable speed motion transmitting means and operated in timed relation to cyclic back and forth motion of the torch for varying the speed of motion imparted to the blank and so correlating blank speed with torch speed that the speed of relative motion between the blank and the torch is substantially constant.

7. The flame cutting machine set forth in claim 6 further characterized by the fact that said proportioning and motion transmitting mechanism comprises an adjustable pantograph so that by its adjustment teeth of different sizes but having the same proportions may be cut using the same cam.

8. In a machine for flame cutting equi-spaced teeth in a blank, the combination of: a blank support constrained to movement in a predetermined path and adapted to have a blank fixed thereto for movement therewith; a torch support, a cutting torch mounted on the torch support for cutting teeth in a blank mounted on the blank support; means mounting said blank and torch supports for relative motion toward and from one another along a defined path which traverses said predetermined path of movement of the blank support; means for adjustably securing the torch to its support to provide for adjustment of the nominal positional relationship between the torch and the blank support; drive means including a rotatable cam and motion transmitting means reciprocated by rotation of said rotatable cam for driving one of said supports to thereby effect said relative motion of the blank and torch supports toward and from one another between defined limits corresponding to the depth of the cuts to be made in the blank; drive means for moving the blank support along said predetermined path; means for synchronizing said two drive means to produce movement of the blank support along said predetermined path at a speed so related to the rate and extent of relative motion of the torch and blank supports toward and from one another as to produce teeth on the blank by the torch; and an adjustable proportioning mechanism forming part of said motion transmitting means and connected between the cam and the support driven thereby for adjusting the extent of relative motion of the torch and blank supports toward and from one another in consequence to rotation of said rotatable cam, so that said proportioning mechanism provides for adjustment of the depth of the cut to be made in the blank by the torch.

GLENWAY MAXON, Jr.

REFERENCES CITED

The following references are of record in the file of this patent:

UNITED STATES PATENTS

| Number | Name | Date |
|---|---|---|
| 528,025 | Perry | Oct. 23, 1894 |
| 2,088,695 | Fausek et al. | Aug. 3, 1937 |
| 2,142,436 | Clabeaux | Jan. 9, 1939 |
| 2,190,360 | Howard | Feb. 3, 1940 |
| 2,196,292 | Coughlin | Apr. 9, 1940 |
| 2,295,229 | McGuire | Sept. 8, 1942 |
| 2,383,607 | Lovers et al. | Aug. 28, 1945 |
| 2,415,801 | Armitage et al. | Feb. 11, 1947 |
| 2,432,161 | Johnston | Dec. 9, 1947 |

FOREIGN PATENTS

| Number | Country | Date |
|---|---|---|
| 351,507 | Germany | Apr. 8, 1922 |

OTHER REFERENCES

Schwamb et al.: "Elements of Mechanism," 2nd. Ed. revised, 1908, pages 66, 67; pub. by John Wiley & Sons, New York.